(12) United States Patent
Abe et al.

(10) Patent No.: US 7,519,553 B2
(45) Date of Patent: Apr. 14, 2009

(54) METHOD AND SYSTEM FOR DEBT COLLECTION OPTIMIZATION

(75) Inventors: Naoki Abe, Rye, NY (US); James J. Bennett, Fairport, NY (US); David L. Jensen, Peekskill, NY (US); Richard D. Lawrence, Ridgefield, CT (US); Prem Melville, White Plains, NY (US); Edwin Peter Dawson Pednault, Cortlandt Manor, NY (US); Cezar Pendus, Yardley, PA (US); Chandan Karrem Reddy, Ossining, NY (US); Vincent Philip Thomas, Severna Park, MD (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/743,293

(22) Filed: May 2, 2007

(65) Prior Publication Data

US 2008/0275800 A1 Nov. 6, 2008

(51) Int. Cl.
*G06Q 40/00* (2006.01)
(52) U.S. Cl. .............................. 705/35; 705/38; 705/30
(58) Field of Classification Search .................. 705/35, 705/40, 30, 38
See application file for complete search history.

(56) References Cited

U.S. PATENT DOCUMENTS

| 6,098,052 A * | 8/2000 | Kosiba et al. ................. 705/40 |
| 2003/0216994 A1* | 11/2003 | Peljto et al. .................... 705/37 |
| 2004/0015386 A1* | 1/2004 | Abe et al. ...................... 705/10 |

OTHER PUBLICATIONS

Pednault et al., Sequential Cost-Sensitive Decision Making with Reinforcement Learning, 2002.*
Natarajan et al., Segmented Regression Estimators for Massive Data Sets.*
N. Abe et al.; "Cross Channel Optimized Marketing by Reinforcement Learning".
E. Pednault et al.; "Sequential Cost-Sensitive Decision Making with Reinforcement Learning"; SIGKDD 2002, Edmonton, Alberta, Canada.
L. P. Kaelbling et al.; "Reinforcement Learning: A Survey"; Journal of Artificial Intelligence Research, vol. 4, 1996; pp. 237-285.
C. Watkins; "Technical Note: Q-Learning", Machine Learning, vol. 8, 1992; pp. 55-68.
X. Wang et al., "Efficient Value Function Approximation Using Regression Trees"; Oregon State University, Department of Computer Science; pp. 1-11.
R. Natarajan et al.; "Segmented Regression Estimators for Massive Data Sets".
Baird III; "Reinforcement Learning in Continuous Time: Advantage Updating"; Proceedings of the International Conference on Neural Networks, Orlando, FL, Jun. 1994.

* cited by examiner

*Primary Examiner*—Thomas A Dixon
*Assistant Examiner*—Hao Fu
(74) *Attorney, Agent, or Firm*—Whitham, Curtis, Christofferson & Cook, PC; Stephen C. Kaufman

(57) ABSTRACT

The present invention employs data processing systems to handle debt collection by formulation the collections process as a Markov Decision Process with constrained resources, thus making it possible automatically to generate an optimal collections policy with respect to maximizing long-term expected return throughout the course of a collections process, subject to constraints on the available resources possibly in multiple organizations. This is accomplished by coupling data modeling and resource optimization within the constrained Markov Decision Process formulation and generating optimized rules based on constrained reinforcement learning process comprising applied on the basis of past historical data.

9 Claims, 13 Drawing Sheets

Block Diagram

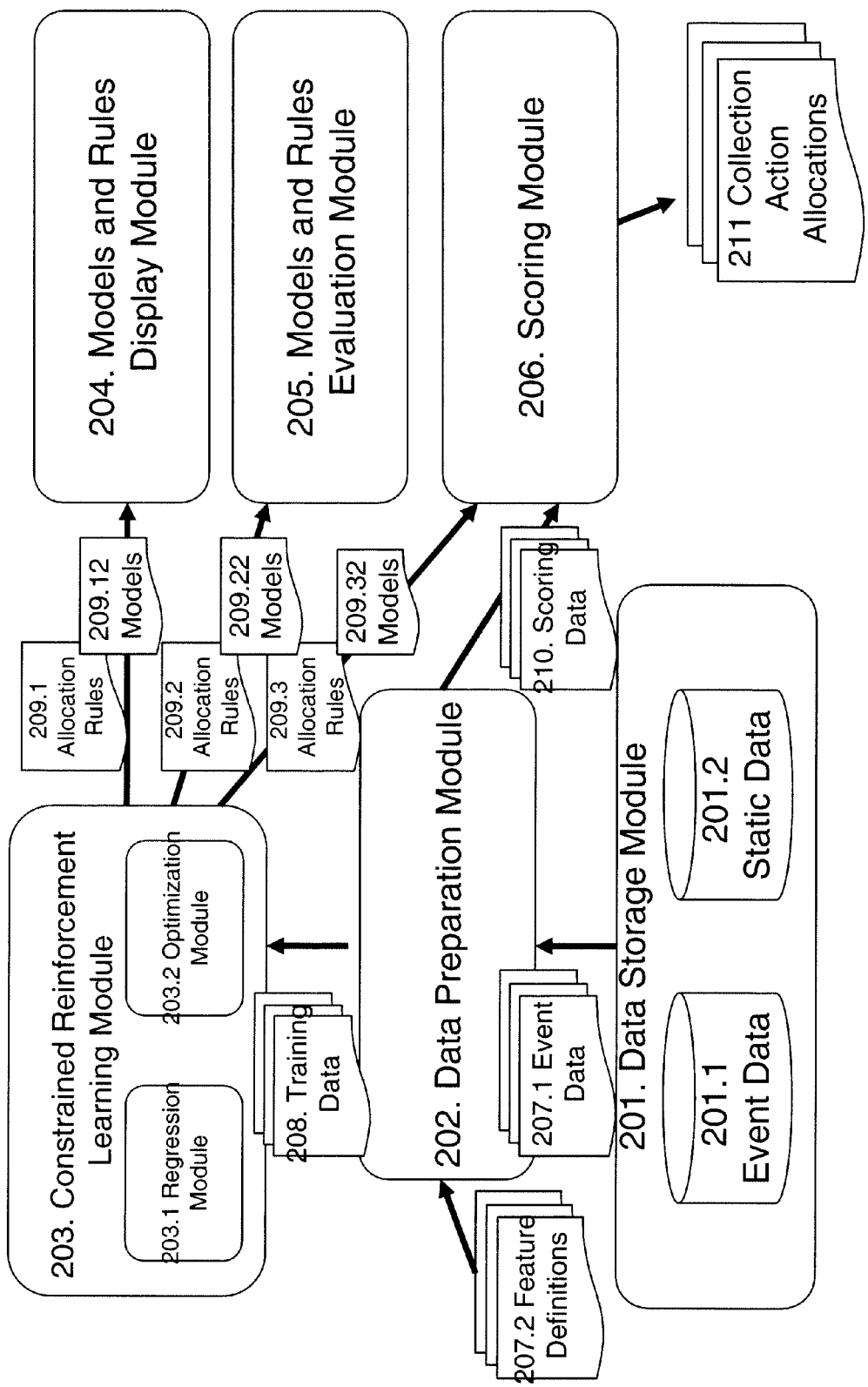
Figure 2: Block Diagram

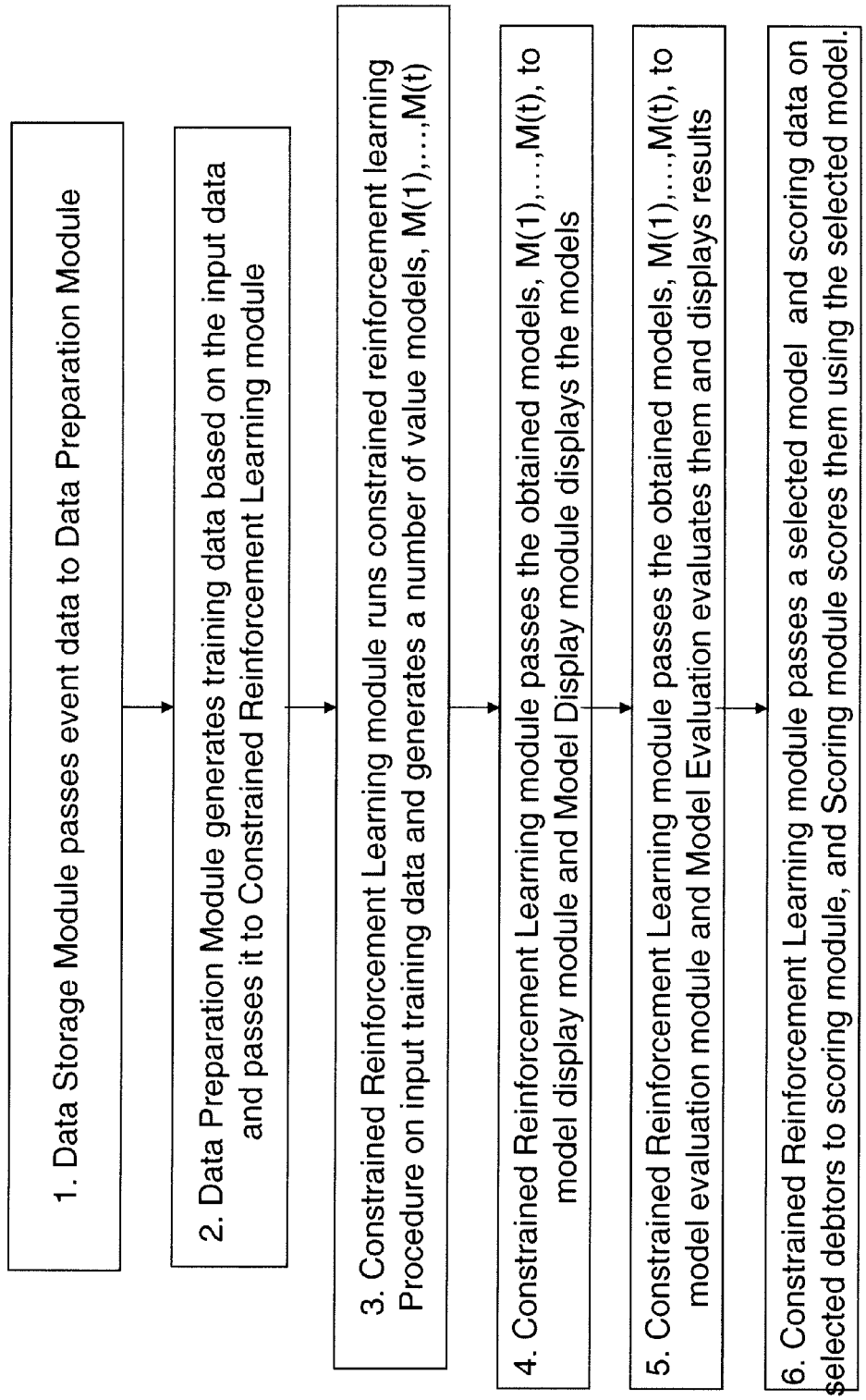
Figure 3: Flow Chart

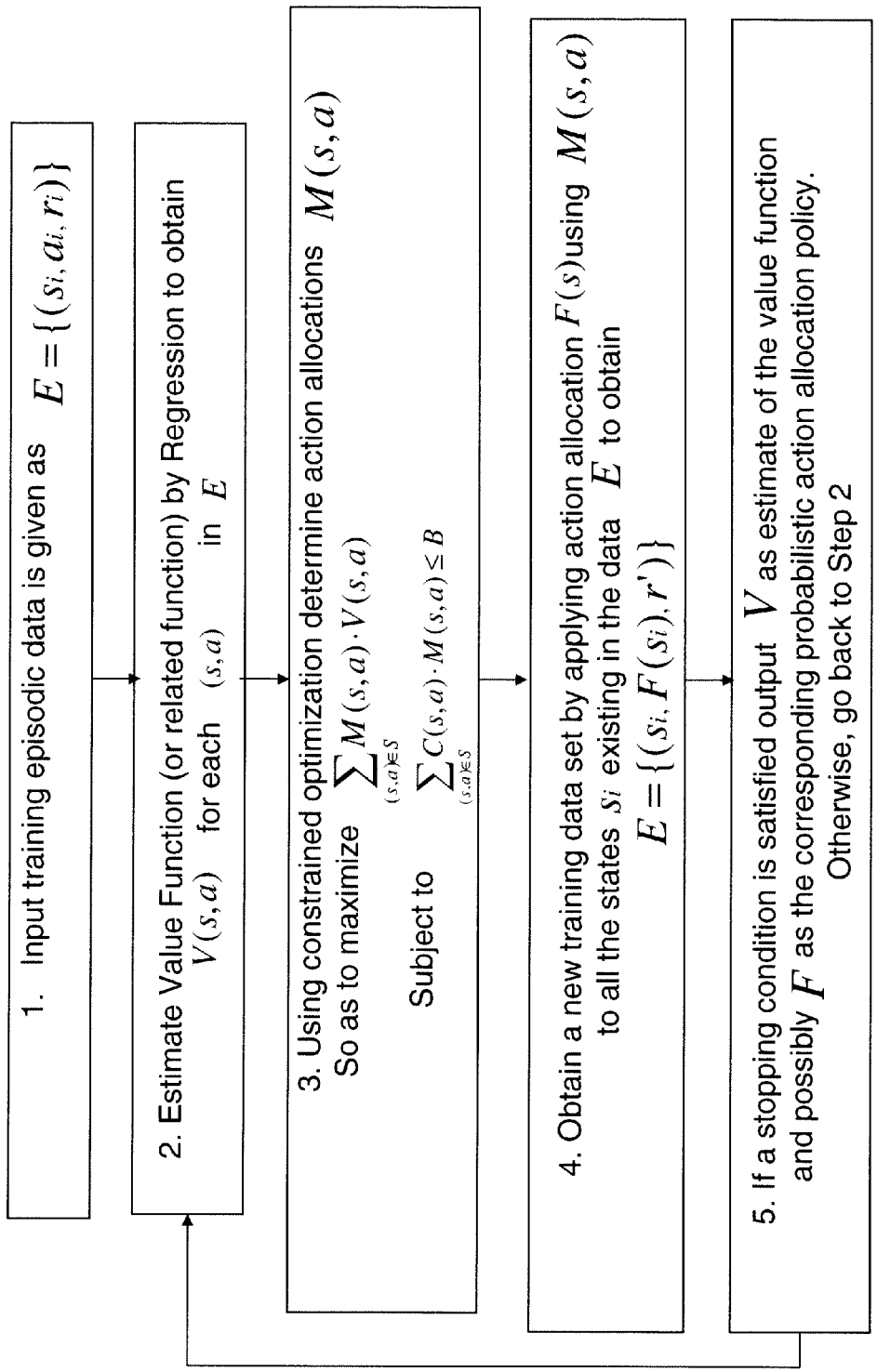
Figure 4: Flow Chart for Constrained Reinforcement Learning Module

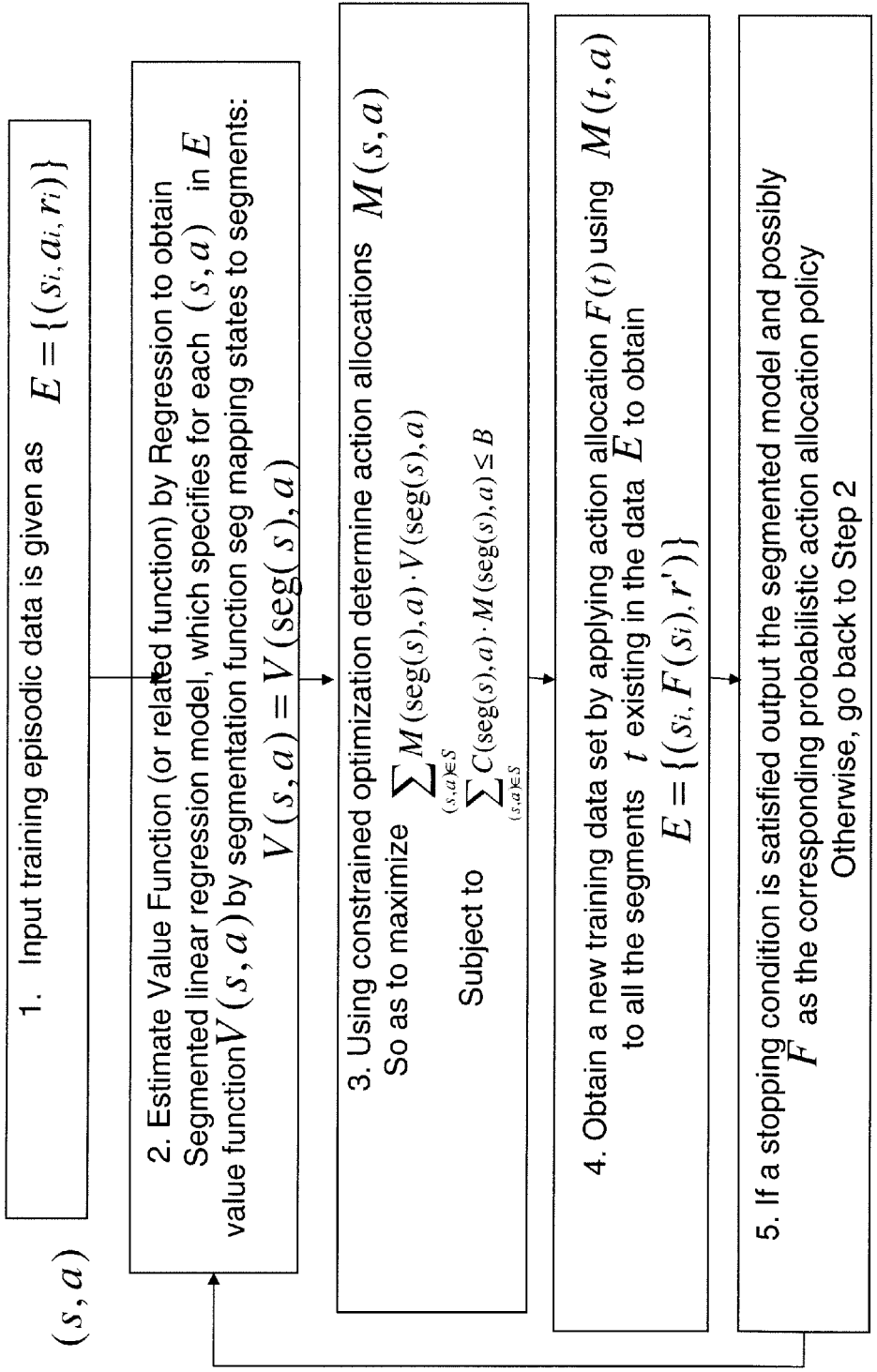

Figure 5: Flow Chart for Constrained Reinforcement Learning Module using Segmented Linear Regression 1. Input training episodic data is given as $E = \{(s_i, a_i, r_i)\}$ 2. Estimate Value Function (or related function) by Regression to obtain Segmented linear regression model, which specifies for each $(s, a)$ in $E$ value function $V(s,a)$ by segmentation function seg mapping states to segments:
$$V(s,a) = V(\text{seg}(s), a)$$

3. Using constrained optimization determine action allocations $M(s,a)$
So as to maximize $\sum_{(s,a) \in S} M(\text{seg}(s), a) \cdot V(\text{seg}(s), a)$
Subject to $\sum_{(s,a) \in S} C(\text{seg}(s), a) \cdot M(\text{seg}(s), a) \leq B$ 4. Obtain a new training data set by applying action allocation $F(t)$ using $M(t,a)$ to all the segments $t$ existing in the data $E$ to obtain
$$E = \{(s_i, F(s_i), r')\}$$

5. If a stopping condition is satisfied output the segmented model and possibly $F$ as the corresponding probabilistic action allocation policy
Otherwise, go back to Step 2

Figure 6: An Example Action Allocation Rule

If 8551 <= Total_Collected < 49929
and Stage = Local_Office
and Number_of_Payment < 1
and Number_of_Debtor_Contact < 1
and 7 <= Number_of_Past_Successful_Collections Then Perform_Field_Visit with probability 0.7
And Perform_Phone_Call with probability 0.3

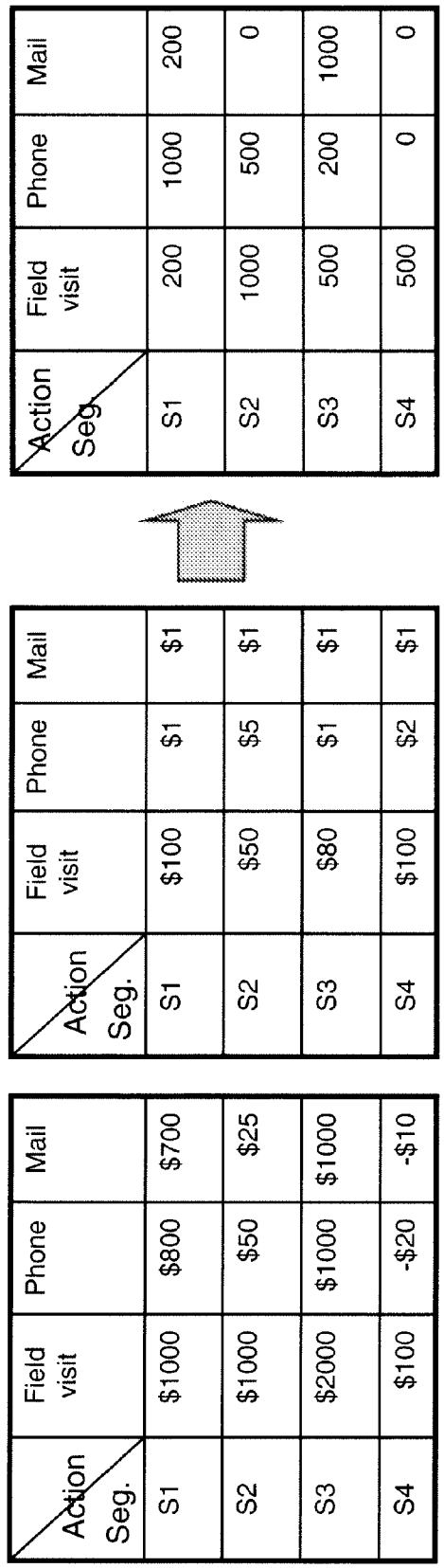
Figure 7: Resource Optimization Problem

Figure 8

Procedure Constrained-RL

Premise:
A base learning module, Base, for regression is given.

Input data:
$C, B$: cost matrix $C$ and a resource bound $B$.
$\Pi(C, B)$ denotes the class of policies adhereing to constraints $C, B$.
$D = \{e_i | i = 1, ..., N\}$ where
$\quad e_i = \{\langle s_{i,j}, a_{i,j}, r_{i,j} \rangle | j = 1, ..., l_i\}$
($e_i$ is the $i$-th episode, and $l_i$ is the length of $e_i$.)

1. For all $e_i \in D$
   $D_i^{(0)} = \{\langle (s_{i,j}, a_{i,j}), r_{i,j} \rangle | j = 1, ..., l_i\}$
2. $Q^{(0)} = \text{Base}(\cup_{i=1,...,N} D_i^{(0)})$
3. For $k = 1$ to $K$
   3.1 Set $\alpha_k$, e.g. $\alpha_k = \frac{1}{k}$
   3.2 For all $e_i \in D$
      For $j = 1$ to $l_i - 1$
         $v_{i,j}^{(k)} = (1 - \alpha_k) Q^{(k-1)}(s_{i,j}, a_{i,j})$
         $\quad + \alpha_k (r_{i,j} + \gamma \text{OPT}_{\pi \in \Pi(\mathbf{C},\mathbf{B})} Q^{(k-1)}(s_{i,j+1}, \pi(\mathbf{s})))$
         $D_i^{(k)} = \{\langle (s_{i,j}, a_{i,j}), v_{i,j}^{(k)} \rangle | j = 1, ..., l_i - 1\}$
   3.3 $D^{(k)} = \cup_{i=1,...,N} D_i^{(k)}$
   3.4 $Q^{(k)} = \text{Base}(D^{(k)})$
4. Output the final model, $Q^{(K)}$ Constrained reinforcement learning based on Batch Q-learning.

Figure 9

Procedure Batch-AU

Premise:

A base learning module, Base, for regression is given.

Input data: $D = \{e_i | i = 1, ..., N\}$ where $e_i = \{\langle s_{i,j}, a_{i,j}, r_{i,j} \rangle | j = 1, ..., l_i\}$ ($e_i$ is the $i$-th episode, and $l_i$ is the length of $e_i$.)

$C, B$: cost matrix $C$ and a resource bound $B$.

1. For all $e_i \in D$ 1.1 For $j = 1$ to $l_i$, $\Delta t_{i,j} = t_{i,j+1} - t_{i,j}$ 2. For all $e_i \in D$ $D_i^{(0)} = \{\langle (s_{i,j}, a_{i,j}), \frac{r_{i,j}}{\Delta t_{i,j}} \rangle | j = 1, ..., l_i\}$ 3. $A^{(0)} = \text{Base}(\cup_{i=1,...,N} D_i^{(0)})$ 4. For all $e_i \in D$ and for $j = 1$ to $l_i - 1$, initialize 4.1 $A_{i,j}^{(0)} = A^{(0)}(s_{i,j}, a_{i,j})$ 4.2 $Amax_{i,j}^{(0)} = \max_{a'} A^{(0)}(s_{i,j}, a')$ 4.3 $V_{i,j}^{(0)} = Amax_{i,j}^{(0)}$ 5. For $k = 1$ to $K$ 5.1 Set $\alpha_k, \beta_k$ and $\omega_k$, e.g. $\alpha_k = \beta_k = \omega_k = \frac{1}{k}$ 5.2 For all $e_i \in D$ For $j = 1$ to $l_i - 1$ $A_{i,j}^{(k)} = (1 - \alpha_k) A_{i,j}^{(k-1)}$
   $+ \alpha_k (Amax_{i,j}^{(k-1)} + \frac{r_{i,j} + \gamma^{\Delta t_{i,j}} V_{i,j+1}^{(k-1)} - V_{i,j}^{(k-1)}}{\Delta t_{i,j}})$ $D_i^{(k)} = \{\langle (s_{i,j}, a_{i,j}), A_{i,j}^{(k)} \rangle | j = 1, ..., l_i - 1\}$ 5.3 $A^{(k)} = \text{Base}(\cup_{i=1,...,N} D_i^{(k)})$ 5.4 For all $e_i \in D$ and for $j = 1$ to $l_i - 1$, update $A_{i,j}^{(k)} = A^{(k)}(s_{i,j}, a_{i,j})$ $Amax_{i,j}^{(k)} = \max_{a'} A^{(k)}(s_{i,j}, a')$ $V_{i,j}^{(k)} = (1 - \beta_k) V_{i,j}^{(k-1)}$
   $+ \beta_k (\frac{Amax_{i,j}^{(k)} - Amax_{i,j}^{(k-1)}}{\alpha_k} + V_{i,j}^{(k-1)})$ 5.5 For all $e_i \in D$ and for $j = 1$ to $l_i - 1$, normalize $A_{i,j}^{(k)} = (1 - \omega_k) A_{i,j}^{(k)} + \omega_k (A_{i,j}^{(k)} - Amax_{i,j}^{(k)})$ 6. Output the final advantage model, $A^{(K)}$.

Batch reinforcement learning based on advantage updating.

Figure 10

> Procedure Constrained-Batch-AU
> Premise:
> A base learning module, Base, for regression is given.
> Input data:
> $C, B$: cost matrix $C$ and a resource bound $B$.
> $\Pi(C, B)$ denotes the class of policies adhereing to constraints $C, B$.
> $D = \{e_i | i = 1, ..., N\}$ where
> $\quad e_i = \{\langle s_{i,j}, a_{i,j}, r_{i,j}\rangle | j = 1, ..., l_i\}$
> ($e_i$ is the $i$-th episode, and $l_i$ is the length of $e_i$.)
> 1. For all $e_i \in D$
>   1.1 For $j = 1$ to $l_i$, $\Delta t_{i,j} = t_{i,j+1} - t_{i,j}$
> 2. For all $e_i \in D$
>   $D_i^{(0)} = \{\langle (s_{i,j}, a_{i,j}), \frac{r_{i,j}}{\Delta t_{i,j}} \rangle | j = 1, ..., l_i\}$
> 3. $A^{(0)} = \text{Base}(\cup_{i=1,...,N} D_i^{(0)})$
> 4. For all $e_i \in D$ and for $j = 1$ to $l_i - 1$, initialize
>   4.1 $A_{i,j}^{(0)} = A^{(0)}(s_{i,j}, a_{i,j})$
>   4.2 $Amax_{i,j}^{(0)} = \text{OPT}_{\pi \in \Pi(C,B)} A^{(0)}(s_{i,j}, \pi(s_{i,j}))$
>   4.3 $V_{i,j}^{(0)} = Amax_{i,j}^{(0)}$
> 5. For $k = 1$ to $K$
>   5.1 Set $\alpha_k, \beta_k$ and $\omega_k$, e.g. $\alpha_k = \beta_k = \omega_k = \frac{1}{k}$
>   5.2 For all $e_i \in D$
>     For $j = 1$ to $l_i - 1$
>       $A_{i,j}^{(k)} = (1 - \alpha_k) A_{i,j}^{(k-1)}$
>       $\quad + \alpha_k (Amax_{i,j}^{(k-1)} + \frac{r_{i,j} + \gamma^{\Delta t_{i,j}} V_{i,j+1}^{(k-1)} - V_{i,j}^{(k-1)}}{\Delta t_{i,j}})$
>       $D_i^{(k)} = \{\langle (s_{i,j}, a_{i,j}), A_{i,j}^{(k)} \rangle | j = 1, ..., l_i - 1\}$
>   5.3 $A^{(k)} = \text{Base}(\cup_{i=1,...,N} D_i^{(k)})$
>   5.4 For all $e_i \in D$ and for $j = 1$ to $l_i - 1$, update
>     $A_{i,j}^{(k)} = A^{(k)}(s_{i,j}, a_{i,j})$
>     $Amax_{i,j}^{(k)} = \text{OPT}_{\pi \in \Pi(C,B)} A^{(k)}(s_{i,j}, \pi(s_{i,j}))$
>     $V_{i,j}^{(k)} = (1 - \beta_k) V_{i,j}^{(k-1)}$
>     $\quad + \beta_k (\frac{Amax_{i,j}^{(k)} - Amax_{i,j}^{(k-1)}}{\alpha_k} + V_{i,j}^{(k-1)})$
>   5.5 For all $e_i \in D$ and for $j = 1$ to $l_i - 1$, normalize
>     $A_{i,j}^{(k)} = (1 - \omega_k) A_{i,j}^{(k)} + \omega_k (A_{i,j}^{(k)} - Amax_{i,j}^{(k)})$
> 6. Output the final advantage model, $A^{(K)}$.

Batch constrained reinforcement learning based on advantage updating.

Figure 11: Feature Description Language according to the Preferred Embodiment

```
<feature-set> := <feature> | <feature> <feature-set>
<feature> := a(<feature>) | <fn-exp>
<fn-exp> := tsum(a(<feature>), <delta-t>, c(<feature>))
         | tcount(<delta-t>,c(<feature>))
         | tsumuntil(a(<feature>),c(<feature>))
         | telapsed(c(<feature>))
<delta-t> := real where a is an arithmetic or logical expression
and c is a conditional (boolean) expression
```

Figure 12: Example Feature Definitions for
the Data Preparation Module

```
<field name='NPAY_REC3m' desc='Number of
payments received in the last 3 months'>
    tcount("E", 3m, "E= 'TRANSACTION'")
</field>

<field name='TOT_PAID' desc='Amount of total liability
paid to date'>
    tsum("TRANSACTION_AMT", "E= 'TRANSACTION'")
</field>

<field name='T_Since_Last_Resp' desc='Time elapsed
since last response from taxpayer'>
    telapsed(TP_Resp != 0)
</field>
```

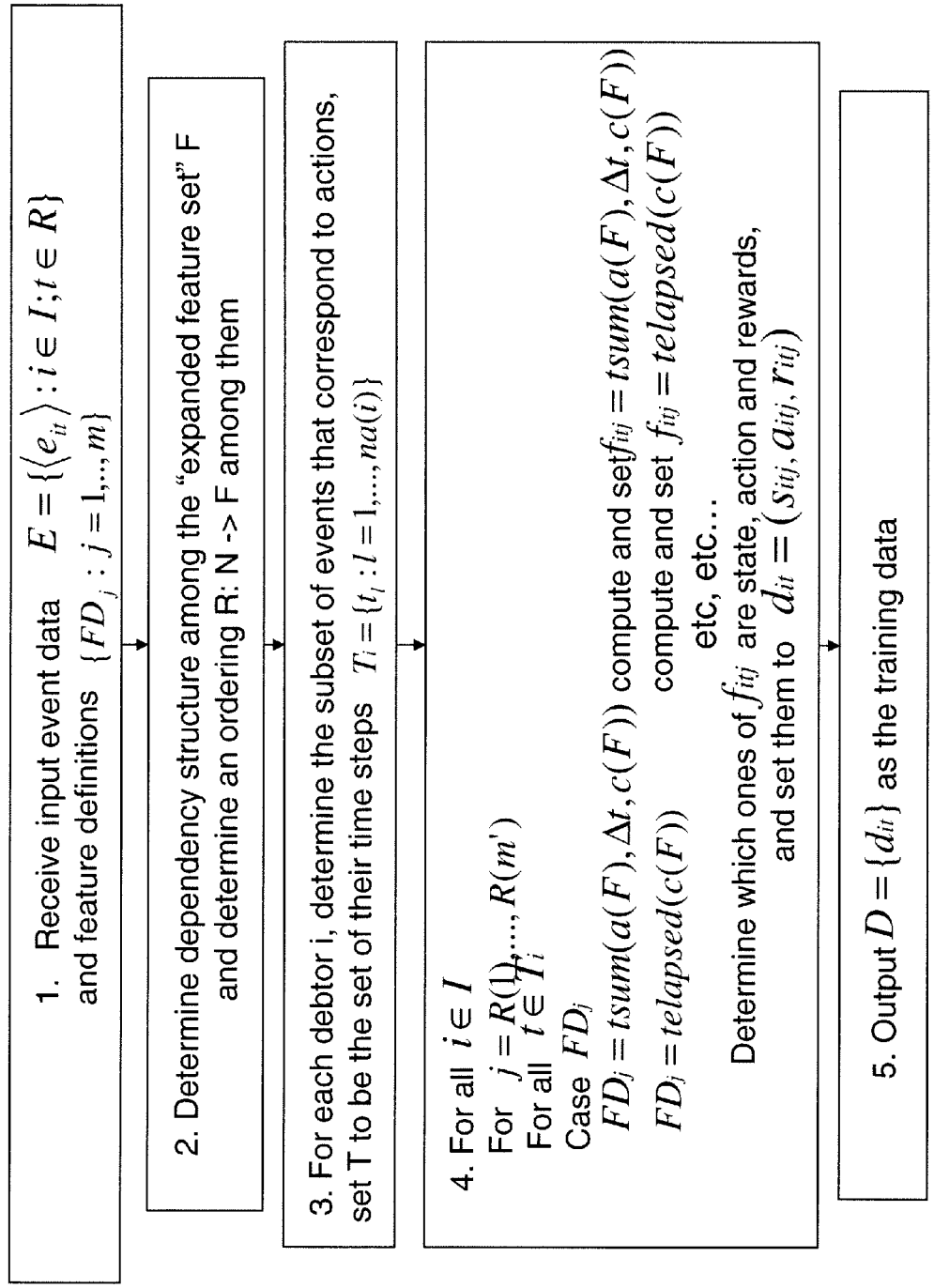

METHOD AND SYSTEM FOR DEBT COLLECTION OPTIMIZATION

BACKGROUND OF THE INVENTION

1. Field of the Invention

The present invention relates to debt collection.

2. Background Description

Debt collection has long been an essential task in both business and government operations. An optimal debt collection policy maximizes expected return, subject to resource constraints, throughout the course of a collections process. Existing solutions for optimizing debt collection policies are based on manually constructed business rules, sometimes enhanced and refined with data analytics and resource optimization. To date, there has not been a method or system for automatically generating debt collection policies optimized with respect to long-term expected return and adhering to resource, legal and business constraints governing the collection activities.

SUMMARY OF THE INVENTION

The present invention employs data processing automation to optimize debt collection policies by formulating the collections process as a Markov Decision Process (MDP) with constrained resources. This makes it possible automatically to generate an optimal collections policy with respect to the maximization of long-term expected return throughout the course of the collections process, subject to constraints on the available resources possibly in multiple organizations, as well as business and legal constraints there may be on the collection actions. To accomplish this, the present invention couples data modeling and resource optimization within the constrained MDP formulation. The present invention generates optimized rules based on data modeling and optimization applied on the basis of past historical data of collections activities.

The present invention optimizes an entire debt collection process based on data analytics and optimization. The invention models the debt collection process via a constrained MDP and couples data analytics and optimization within this formulation, allowing the optimization of debt collection actions to maximize long-term expected returns throughout the course of the collections process, subject to various constraints governing the collection actions, possibly including bounds on the collection resources available, possibly across organizations, as well as business and legal constraints on possible collection actions at any given situation for a given debtor.

By formulating a debt collection process as an MDP, it is possible to address the optimization of sequential courses of action in the presence of sequential dependencies between them. For example, the issuance of a warrant on behalf of a tax collection agency does not yield immediate pay-off. A warrant may, however, be a necessary precursor to obtaining a future pay-off through levy, seizure, or other actions. Thus, the value of a warrant depends on the expected value of subsequent actions such as levy or seizure. Similarly, a business's filing of a debt collection lawsuit does not yield immediate pay-off. The commencement of a lawsuit is, however, a necessary precursor to obtaining a final judgment that can be used to obtain payment by executing the judgment against a debtor's property. The value of a lawsuit thus depends on the values of subsequent actions needed successfully to bring the lawsuit to final judgment and then to execute the judgment upon the debtor's assets.

Extending further, the formulation of a debt collection process as a constrained MDP addresses the optimization of sequential courses of action in the presence of resource as well as other types of constraints on the collection actions to be performed. For example, the issuance of a warrant on behalf of a state tax collection agency does not yield immediate pay-off, but may be a necessary precursor to obtaining a future pay-off through levy, seizure, or other actions. Thus, the value of a warrant depends on the resources available to execute the subsequent actions such as levy or seizure. Similarly, the value of a lawsuit depends on the resources available for subsequent actions needed successfully to bring the lawsuit to final judgment and then to execute the judgment upon the debtor's assets.

There may also be a variety of legal or business constraints that prohibit a certain collection action to be performed depending on what the status or situation of a given debtor. For example, a warrant must be issued before subsequent legal actions can be taken onto a debtor. The agency may also judge, by policy, that it should not take a certain range of legal actions until a certain number of days has passed since a notification letter has been sent to the debtor. This type of constraints that prohibit certain actions to be taken in certain conditions must be explicitly dealt by regarding them as additional constraints of the collection action optimization process.

Thus, a method, a system, and a machine-readable medium with machine-readable instructions are provided to enable the use of a computer or other data processing automation to: (i) possibly determine a constrained Markov Decision Process model of a debt collection process; (ii) couple data analytics and optimization within said Markov Decision Process model to maximize long-term expected returns throughout the course of the collections process and optimize collection resources possibly across multiple organizations, while adhering to resource, business and/or legal constraints given as input; and (iii) provide an optimized debt collection policy as output.

The method, system, and machine-readable medium of the present invention thus use a computer (a) use a computer to estimate a value function specifying an expected value of each of one or more collection actions for each of one or more states of a debtor; (b) use a constrained reinforcement learning process (i) to approximately estimate said value function with respect to a constrained Markov Decision Process formulation, (ii) to maximize long-term expected return throughout the course of a collection process, and (iii) to optimize collection resources within one or more organizations within or outside a collection agency for maximum expected return subject to one or more given resource, business and/or legal constraints; and (b) use a computer to provide an optimized debt collection policy as output in a machine-readable format.

The constrained reinforcement learning process of the present invention may make use of a segmented linear regression method as a regression module to approximately estimate said value function (a) allowing resource optimization within a constrained reinforcement learning module to be performed with respect to one or more segments output by said segmented linear regression method, (i) approximating an objective function using one or more regression coefficients on ($\alpha$) one or more segment action pairs and ($\beta$) one or more estimated sizes of said segmented action pairs; and (b) allowing said output optimized debt collection policy to be expressed as one or more rules consisting of one or more segments and corresponding action allocations.

The objective function may be approximated using one or more regression coefficients on one or more segment action pairs and one or more observed sizes of said segmented action pairs. An existing business rule, expressed as an action constraint, may be provided as input and used as an additional constraint in a resource optimization process within the constrained reinforcement learning process. A resource optimization module may achieve scalable optimization by formulating an optimization problem using a Dantzig Wolf decomposition. The collection resource that is optimized within an organization may be optimized outside the collection agency for maximum expected return subject to a given resource constraint for said organization. A state feature may be generated in a data preparation procedure via one or more abstract feature definitions specified using a temporal feature description language defined over time series event data. An action constraint feature may be generated in a data preparation procedure via one or more abstract feature definitions specified using a temporal feature description language defined over time series event data. Finally, the output may be sent to a peripheral device, such as a computer screen or a printer, providing output in a human-readable format.

BRIEF DESCRIPTION OF THE DRAWINGS

The foregoing and other objects, aspects and advantages will be better understood from the following detailed description of a preferred embodiment of the invention with reference to the drawings, in which:

FIG. 2 provides a block diagram for the system according to the preferred embodiment of the invention;

FIG. 3 is a flow chart for the method according to the invention, making references to the system shown in FIG. 2;

FIG. 4 is a flow chart for a generic constrained Markov Decision Process module according to the invention;

FIG. 5 is a flow chart for a specific constrained Markov Decision Process module according to the preferred embodiment of the invention, making use of a segmented linear regression method as the regression module;

FIG. 6 is an example action allocation rule output by the system according to the preferred embodiment of the invention;

FIG. 7 is an illustration of a resource optimization problem solved by the optimization module according to the preferred embodiment of the invention;

FIG. 8 is a pseudo-code for an example constrained Markov Decision Process module according to the invention, based on the batch Q-learning procedure;

FIG. 9 provides a pseudo-code for a batch reinforcement learning based on advantage updating;

FIG. 10 is a pseudo-code for a constrained reinforcement learning algorithm based on batch advantage updating in a preferred embodiment of the present invention;

FIG. 11 is a temporal feature description language used in the data generation, or feature generation, module according to a preferred embodiment of the present invention.

FIG. 12 exhibits example feature definitions in the feature description language described above.

FIG. 13 is a flow chart for the feature computation procedure used in the data preparation, or feature generation, module according to a preferred embodiment of the present invention.

DETAILED DESCRIPTION OF THE PREFERRED EMBODIMENTS OF THE INVENTION

Figure 1:
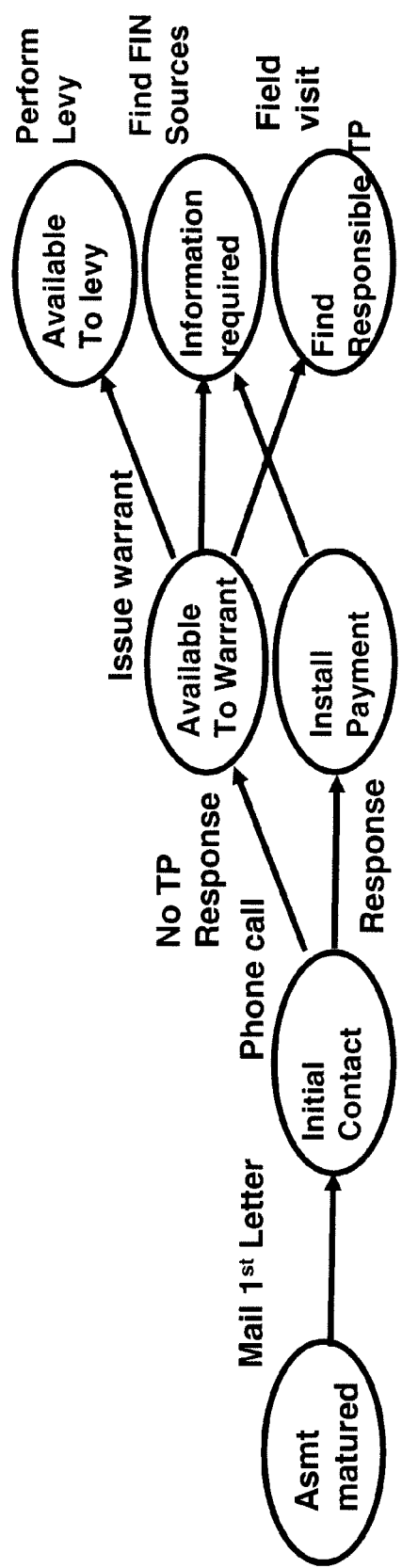
FIG. 1 provides an illustrative example of how Markov Decision Process can be used to formalize the process of debt collection optimization.

The present invention effectively deals with the above-mentioned problems of conventional systems. In many practical cases, the present invention may result in a significant increase in the total return, or the amount collected minus the operation cost, obtained over state-of-the-art approaches.

The present invention includes a system and method of debt collection optimization which may utilize a novel extension of the Markov Decision Process (MDP) framework, extended to address the issue of resource constraints and optimization. MDP provides an advanced framework for modeling general strategy for sequential decision making. The method according to the invention combines MDP with resource optimization and predictive data modeling, to handle the problem of determining an optimal sequence of collection actions, in order to maximize the total return throughout the course of the collection cases, in the presence of constraints on the available resources for executing the collection actions, as well as legal and other forms of constraints on those actions.

In a Markov Decision Process (MDP), the environment is assumed to be in some state at any given point in time. In the case of debt collections, such states would be represented as feature vectors comprising categorical and numerical data fields that characterize what is known about each debtor at the time a decision is made. The state could summarize information on the stage/phase of the debt collection process, and/or the interactions between the collections agency and the debtor and possibly the environment, for example, economy, competitive factors, seasonality, and so forth.

Referring now to the drawings, and more particularly to FIG. 1, there is illustrated a simple schematic example of how the invention formulates the problem of debt collection optimization as an MDP. In FIG. 1, each of the stages, represented by balloons, is defined as a "state". A "state" should quantify the state that the collection process is in. The "State" will in general be represented by vectors of attributes quantifying above. "Action" may be a vector quantifying which of the list of potential collection actions were taken, having a 1 whenever the corresponding action was taken and 0 otherwise.

When the learner, or optimizer, in an MDP takes an action, it receives a finite reward and the environment makes a probabilistic transition to another state. The goal of a learner is to learn to act so as to maximize the expected cumulative reward it receives (usually with future rewards discounted) as the learner takes actions and traverses through the state space. In the case of debt collection optimization, a debtor, with all her past history of collection actions taken onto her and transactions concerning her, is in a certain state at any given point in time. When the collection agency takes an action, the debtor then makes a probabilistic transition to another state, possibly generating a reward, for example in terms of collected debt. This process continues throughout the collection process. The reward at each state transition is the net profit to the enterprise for the debtor in question. It takes into account both the amount collected as a result of the collection actions performed, and the cost of those actions. Application of constrained versions of reinforcement learning to this problem amounts to maximizing the net present value of returns and costs over the collection process of a debtor, or a set of them, while adhering to a set of constraints governing what collection actions are allowed depending on the state.

System Architecture and Control Flow

FIG. 2 is a block diagram for a preferred embodiment of the system of the present invention. The system comprises of the following modules: data storage module 201; data preparation module 202; constrained reinforcement learning module 203; model display module 204; model evaluation module 205; and scoring module 206. Data storage module 201 includes event data store 201.1, static data store 201.2. The data from these data stores are provided as event data 207.1 to the data preparation module 202. This raw data is processed by the data preparation module 202, making reference to the feature definitions 207.2, and the processed data is output as training data 208 to the constrained reinforcement learning module 203. The constrained reinforcement learning module 203 generates models 209.1, 209.2 and 209.3, respectively, to each of the model display module 204, the model evaluation module 205 and the scoring module 206. The scoring module 206 additionally receives scoring data 210 from the data preparation module 202 and generates output collection action allocations 211.

FIG. 3 shows the flow chart of the method, which can be implemented on the system as shown in FIG. 2. With reference now to both FIGS. 2 and 3, the method shown in FIG. 3 begins in function block 301 by accessing the data storage module 201 by the data preparation module 202. In this step, data are obtained that are required for the constrained reinforcement learning module 203, which consist of event data, consisting of all incoming and outgoing events concerning each debtor, and possibly static data, such as demographic information of the debtor. The event data contain historical, dated records of events, with information that specifies the collection actions taken onto the debtor and other actions and decision that may be taken regarding the debtor within the collection agency, as well as all incoming contacts and transactions from the debtor including payment. The event data can be joined with static data on the debtors, if they exit, to retrieve demographic and other attributes for the debtors and events under consideration.

In function block 302, the data preparation module 202 processes the raw event data, making reference to the feature definitions given as input, to generate the training data that will be required by the constrained reinforcement learning module 203. As will be elaborated in the section on "Constrained Reinforcement Learning", these data will be episodic data; that is, each record captures the state, represented by attributes that summarize the collection history as well as the debtor's static attributes. There will be in general multiple records, corresponding to different time steps, for each debtor. There will also be in general many groups of such records, corresponding to the set of debtors under consideration for collection.

Having received episodic data from the data preparation module 202, the constrained reinforcement learning module 203 applies a constrained reinforcement learning method on this data set in function block 303. Here, the constrained reinforcement learning method is an iterative method that makes use of two sub-modules, the regression module 203.1 and the optimization module 203.2, and according to a procedure that will be described in detail in the section on "Constrained Reinforcement Learning", obtains a series of models $109_i$ of action effectiveness, for example, those of the so-called Advantage function, and a series of associated collection action allocation rules. The generated models and action allocation rules will be optionally passed to the model display module 204 to be displayed for inspection by the user, in function block 304, and optionally to the model evaluation module 205 in function block 305, which evaluates the effectiveness of the resulting models and rules, using such criteria as the long term profitability of the collection policy represented by them.

Finally, the allocation rules, and optionally models, are passed to the scoring module 206 in function block 306. The scoring module 206 first generates the debtor attributes for each debtor of interest, which is analogous to the training data generation process, except it now only needs to generate attribute vectors, or debtor profiles, for the current time of decision making, rather than for a subset of the sequence of decision making time points available in the data. The scoring module 206 then uses the action allocation rules, and optionally models, and the generated debtor profiles to generate a nearly optimal collection action allocation for the set of debtors of interest.

Markov Decision Processes

As briefly explained in the introduction, the present invention may utilize an extension of the popular Markov Decision Process (MDP) framework, and the related reinforcement learning methodology. The following is a brief description of an MDP.

At any point in time, the environment is assumed to be in one of a set of possible states. At each time tick (the present invention may assume a discrete time clock), the environment is in some state s, the learner takes one of several possible actions a, receives a finite reward (i.e., a profit or loss) r, and the environment makes a transition to another state s'. Here, the reward r and the transition state s' are both obtained with probability distributions that depend on the state s and action a.

The environment starts in some initial state $s_0$ and the learner repeatedly takes actions indefinitely. This process results in a sequence of actions $$\{a_t\}t\overset{\infty}{=}0,$$

rewards $$\{r_t\}t\overset{\infty}{=}0,$$

and transition states $$\{s_t\}t\overset{\infty}{=}0,$$

The goal of the learner is to maximize the total rewards accrued over time, usually with future rewards discounted. That is, the goal is to maximize the cumulative reward R, $$R = \sum_{t=0}^{\infty} \gamma^t r_t, \qquad (1)$$

where $r_t$ is the reward obtained at the t'th time step and $\gamma$ is some positive constant less than 1. In financial terms, $\gamma$ is a discount factor for calculating the net present value of future rewards based on a given interest rate.

Generally speaking, a learner follows a certain policy to make decisions about its actions. This policy can be represented as a function π mapping states to actions such that π(s) is the action the learner would take in state s. A theorem of Markov Decision Processes is that an optimum policy π* exists that maximizes the cumulative reward given by Equation (1) for every initial state $s_0$.

In order to construct an optimum policy π*, a useful quantity to define is what is known as the value function $Q^\pi$ of a policy. A value function maps a state s and an action a to the expected value of the cumulative reward that would be obtained if the environment started in state s, and the learner performed action a and then followed policy π forever after. $Q^\pi(s, a)$ is thus defined as $$Q^\pi(s, a) = E_\pi\left[\sum_{t=0}^{\infty} \gamma^t r_t \mid s_0 = s, a_{0=a}\right], \quad (2)$$

where $E_\pi$ denotes the expectation with respect to the policy π that is used to define the actions taken in all states except the initial state $s_0$.

A remarkable property of Markov Decision Processes is that the value function Q* of an optimum policy π* satisfies the following recurrence relation, known as the Bellman optimality equation:

$$Q^*(s, a) = E_r[r \mid s, a] + \gamma E_{s'}\left[\max_{a'} Q^*(s', a') \mid s, a\right], \quad (3)$$

where the first $E_r[r|s,a]$ is the expected immediate reward obtained by performing action a in state s, and the second term $$E_{s'}\left[\max_{a'} Q^*(s', a') \mid s, a\right]$$

is the expected cumulative reward of performing the optimum action in the transition state $s_0$ that results when action a is performed in state s.

The Bellman equation can be solved via fixed-point iteration using the following system of equations:

$$Q_0(s, a) = R(s, a) \quad (4)$$
$$Q_{k+1}(s, a) = R(s, a) + \gamma \sum_{s'} P(s' \mid s, a) \max_{a'} Q_k(s', a')$$

where R(s,a) is the expected immediate reward $E_r[r|s,a]$ and P(s'|s,a) is the probability of ending up in state s' when action a is performed in state s. This solution method is known as value iteration. In the limit, $Q_k(s,a)$ converges to Q*(s,a) a k tends to infinity. The optimum policy is then given by $$\pi^*(s) = \arg\max_a Q^*(s, a).$$

The use of Equation (4), however, requires knowledge of both the expected reward R(s,a) for each state-action pair as well as the state transition probabilities P(s'|s,a). In learning situations these functions are unknown. Therefore, the problem faced by the learner is to infer an optimum policy (e.g., a near optimum policy) over time through observation and experimentation.

Several approaches are known in the literature. One popular reinforcement-learning method known as Q-learning, is based on the Bellman equation (Equation (3)) and value iteration (Equation (4)). Q-learning estimates optimum value functions in an online fashion when the sets of possible states and actions are both finite. The method starts with some initial estimates of the Q-values for each state and then updates these estimates at each time step according to the following equation:

$$Q(s_t, a_t) \rightarrow \quad (5)$$
$$(1-\alpha)Q(s_t, a_t) + \alpha\left(r_t + \gamma\left(\max_{a'} Q(s_{t+1}, a') - Q(s_{t+1}, a_{t+1})\right)\right)$$

It is known that, with some technical conditions, the above procedure probabilistically converges to the optimal value function.

Batch Reinforcement Learning with Function Approximation

In the foregoing description of reinforcement learning, a simplifying assumption was made that is not satisfied in the current setting. The assumption is that the problem space consists of a reasonably small number of atomic states and actions. The Q-learning method described above performs value updates for each state-action pair, which requires that the number of such pairs be finite. In many practical applications, including debt collection optimization, it is natural to treat the state space as a feature space with a large number of both categorical and real-valued features. In such cases, the state space is prohibitively large to represent explicitly, which renders the above methods impractical.

It is for this reason that practical applications of MDP and reinforcement learning methods often require the use of so-called function approximation. Function approximation amounts to representing the value function as some reasonable function of state features and actions.

Given a large amount of training data, consisting of state, action and reward triples observed in the past, reinforcement learning with function approximation attempts to estimate the value function Q(s, a) by reformulating value iteration (i.e., Equation (4)) as an iterative regression problem. In particular, on the first iteration, an estimate of the expected immediate reward function R(s, a) is obtained by using a regression method to predict the value of R(s, a) based on the features that characterize the input state s and the input action a. On the second and subsequent iterations, the same regression method is used again to obtained successively improved predictions of Q(s, a) by using variants of Q-learning (Equation (5)) to recalculate the target values that are to be predicted for each iteration.

Base Regression Method for Function Approximation

As a base learning method, the present invention may potentially employ any regression methods, but it results in a particularly efficient and effective method when it employs a segmented regression method that segments the instance space into a finite number of segments possessing relatively uniform characteristics with respect to the regression problem at hand and develops a regression model for each of those segments. This class of methods includes, for example, a multivariate linear-regression tree method implemented in the IBM ProbE data mining engine. This learning method belongs to the so-called "regression tree" methods, and produces decision trees with multivariate linear regression models at the leaves.

Constrained Reinforcement Learning (Constrained MDP)

The Markov Decision Process and reinforcement learning with function approximation in the foregoing descriptions lack the perspective of constraints on the available resources for performing the collection actions. The lack of the resource constraints aspect has a serious consequence in the quality of the obtained solution of the MDP. For example, in estimating the long term expected reward for an action that is a precursor for further actions, such as "issuing a warrant", the maximization on the right hand side of equations (3), (4) and (5) will ensure that this estimation be done with the best case scenario in which the best subsequent actions having the greatest expected value are always taken, such as performing levy and seizure. In the presence of constraints on the resources, however, it is hardly reasonable to suppose that the best actions can always be performed. Thus, this naïve formulation would most likely result in an unrealistically high value estimate for actions such as "warrant". Since issuing a warrant by an automated means requires little resource, even if resource optimization is performed on top of the output policy of the above MDP process, it is likely that an inappropriately numerous warrant actions would be recommended, resulting in an unsatisfactory collections policy.

It is, in part, for the motivation described above that the present invention formulates the debt collection optimization problem as a constrained MDP. In a constrained MDP, Bellman's equation (3) is modified by replacing the maximization by constrained optimization. Since resource optimization makes sense only with respect to a population of states or debtors, the modified equation has to be defined with respect to a population, accordingly. More specifically, in place of Equation (3) we now have, for all (s, a) in a given population $$Q(s,a)=E[r|s,a]+\gamma E[Opt_{\pi \in \Pi}Q(s',\pi(s'))] \quad (6)$$

Here, Π denotes a class of policies that adhere to given resource constraints on the population.

The above formulation leads to an iterative algorithm for estimating the Q-value function, that repeatedly updates its estimate of Q-value function by applying the base regression method on a training data set in which each datum contains the right-hand side of Equation (6) as the target value for the corresponding state action pair, and in which the estimated models of the Q-value function from the previous iteration are used to calculate the Q-value expressions on the right hand side.

Referring back to the drawings again, FIG. 4 exhibits the flow chart for the above estimation method for the value function in the constrained MDP formulation. Specifically, Step 1 of the flow chart as illustrated in FIG. 4 takes as input a training data set, E, consisting of a sequence of triples (s, a, r) of state, action, and reward, observed in the past, for each of multiple debtors. Step 2 invokes a regression module to estimate the value function by regressing for the target values specified by the rewards, r, as a function of the state and action features, (s, a). Step 3 invokes a constrained optimization procedure by using a linear programming technique, that determines the number of action allocations M(s,a) to each (s,a) pair so as to maximize the overall expected value, calculated as the sum total of M(s,a)V(s,a) over all (s,a) in the training data, namely $$\sum_{(s,a) \in S} M(s, a) \cdot V(s, a) \quad (7)$$

subject to resource constraints specified as input to the optimization module, i.e.

$$\sum_{(s,a) \in S} M(s, a) \cdot C(s, a) \leq B \quad (8)$$

Step 4 applies Equation (6) to compute the re-estimates, denoted r', of the value function values, using the value function estimates from the previous iteration for the Q-values on the right-hand side. Step 5 determines whether a certain stopping condition is satisfied, and if it is then it stops and outputs the estimated regression model for the value function from the last iteration as the output value function estimate model. Otherwise, it goes back to Step 2 and iterates the steps 2 through 4. Here the stopping condition may simply be a pre-determined number of iterations given as input, or may be a more complex type of condition that, for example, judges whether the new Q value function estimate has not changed significantly from the previous iteration, or that it has significantly deteriorated in its quality.

The procedure described above and depicted in the flow chart of FIG. 4 is generic and can benefit from the use of a particular type of regression module in Step 2. More specifically, using a segmented linear regression method such as the IBM ProbE as the base regression method for function approximation will lead to a particularly effective procedure. A segmented linear regression method outputs, as estimation of the Q-value function, a set of segments, each of which defines a subset, or equivalently segment, of state-action pairs associated with debtors according to a conjunction of conditions on the state and optionally action feature values. Associated with each segment is a linear regression model consisting of a coefficient vector, specifying, in particular, the coefficients for the action features representing the degree of contribution of each action feature to the Q-value estimate. Given the said set of segments and the corresponding action-coefficient vectors, the goal of resource-optimization is then formulated as the problem of determining action allocations to the sub-population in each of the segments, so as to maximize the objective function defined as the sum total of the Q-estimates, expressed as the sum of inner products of the action-coefficient vectors and the action allocations, subject to the constraints on the set of actions performable on the population, determined by the resource constraints.

The optimal action allocations output by the optimization module can be interpreted as a probabilistic policy assigning a probability to each of the possible actions, for each of the states. Thus the constrained reinforcement learning procedure, shown in FIG. 4, can use a randomized procedure to assign an action according to the probabilities specified by the output probabilistic policy, in determining the value of the optimal value on the right-hand side of Equation (6). More specifically, given the output action allocations M(s,a), it may employ a probabilistic policy assignment function, F, mapping each state s probabilistically to action a, with probability p(a|s) as specified below, to obtain the maximum value in expectation.

$$p(a|s) = \frac{M(s, a)}{\sum_{a' \in A} M(s, a')} \quad (9)$$

Referring back to the drawings again, FIG. 5 exhibits the flow chart for the above estimation method for the value function in the constrained MDP formulation, using in particular a segmented linear regression method for its regression modeling step. Specifically, Step 1 of the flow chart as illustrated in FIG. 5 takes as input a training data set, E, consisting of a sequence of triples (s, a, r) of state, action, and reward, observed in the past, for each of potentially multiple debtors. Step 2 invokes a segmented linear regression module to estimate the value function by regressing for the target values specified by the rewards, r, as a function of the state segment t and action features a, to obtain, for the action value coefficient V(t,a) for each segment t and each action a. In the figure, seg(s) is used to denote the segment to which state s belongs to. The optimization problem solved in Step 3 corresponds exactly to Step 3 in the generic method of FIG. 4, except using the segmented linear regression method the equations (8) and (9) become equivalent to solving the analogous optimization problem with respect to the segments, rather than individual states in the data:

$$\sum_{(s,a) \in S} M(seg(s), a) \cdot V(seg(s), a) = \sum_{\exists a, s : (s,a) \in S \land t = seg(s)} size(t) \cdot M(t, a) \cdot V(t, a) \quad (10)$$

$$\sum_{(s,a) \in S} M(s, a) \cdot C(s, a) = \sum_{\exists a, s : (s,a) \in S \land t = seg(s)} size(t) \cdot M(t, a) \cdot C(t, a) \leq B \quad (11)$$

In the above, we used size(t) to denote the size of the segment t, that is, the number of occurrences in the data of states belonging to the segment t. Step 3 may invokes a linear programming technique to determine the number of action allocations M(t,a) to each segment action pair, (t,a), so as to maximize the overall expected value as specified in (10), subject to resource constraints specified as in (11). Step 4 applies Equation (6) to compute the re-estimates, denoted r', of the value function values, using the value function estimates from the previous iteration for the Q-values on the right-hand side. Step 5 determines whether a certain stopping condition is satisfied, and if it is then it stops and outputs the estimated regression model for the value function from the last iteration as the output value function estimate model. Otherwise, it goes back to Step 2 and iterates the steps 2 through 4. Here the stopping condition may simply be a pre-determined number of iterations given as input, or may be a more complex type of condition that, for example, judges whether the new Q value function estimate has not changed significantly from the previous iteration, or that it has significantly deteriorated in its quality.

Analogously to the probabilistic action allocation policy described for the generic procedure in FIG. 4, the optimal action allocations output by the procedure with segmented linear regression can be interpreted as a probabilistic policy assigning a probability to each of the possible actions, for each of the segments. Thus the constrained reinforcement learning procedure, shown in FIG. 4, can use a randomized procedure to assign an action according to the probabilities specified by the output probabilistic policy in Step 4. More specifically, given the output action allocations M(t,a), it may employ a probabilistic policy assignment function, F, mapping each segment t probabilistically to action a, with probability p(a|t) as specified below, to obtain the maximum value in expectation.

$$p(a|t) = \frac{M(t, a)}{\sum_{a' \in A} M(t, a')} \quad (12)$$

When the Q-value estimation procedure using segmented linear regression described in FIG. 5 is used, the output model of estimated Q-value function has the added advantage that the probabilistic policy assignment policy F can be used as action allocation rules that can be readily used in the Scoring Module to determine action allocation to a new set of data, possibly for a distinct set of population for which action allocation is desired. An example of an action allocation rule is exhibited in FIG. 6 for illustration.

Referring again to the drawings, FIG. 7 illustrates the optimization problem described above, in the estimation method shown in FIG. 5. In the figure, the table V is an example of the "value estimate" matrix, V(t,a), specifying for each segment t and action a, the estimated value associated with taking a on any debtor in t. In the constrained reinforcement learning method described above, V corresponds to the Q-value estimate given by the regression model. The table C gives an example of the "cost" matrix, C(t,a), specifying the cost associated with taking action a on a debtor in t. Given the two matrices, V and C, along with a bound B on the available resources, the optimization problem is to allocate the number of actions of each type to each of the segments, expressed as action allocation matrix, M(t,a), so as to maximize the objective function as specified in Equation (10), which is nothing but the total expected value associated with the allocated actions, subject to the resource constraint as specified in Equation (11), where we are to interpret S as either the target population of state-action pairs on which the resource optimization is to be done, or a population whose distribution is judged to be sufficiently similar to the target population so that resulting action allocations to the segments will be effective on that population. In FIG. 7, action counts, M(s,a), are allocated to each segment, action pair, so as to maximize the total estimated value:

$$\sum_{(s,a) \in S} M(seg(s), a) \cdot V(seg(s), a) = \sum_{\exists a, s : (s,a) \in S \land t = seg(s)} size(t) \cdot M(t, a) \cdot V(t, a) \quad (10)$$

Subject to resource constraints:

$$\sum_{(s,a) \in S} M(s, a) \cdot C(s, a) = \sum_{\exists a, s : (s,a) \in S \land t = seg(s)} size(t) \cdot M(t, a) \cdot C(t, a) \leq B \quad (11)$$

Here, the cost matrix C could be specified in a number of ways, for example in terms of dollar amount associated with that action, or in terms of hours associated with taking that action, as long as the resource bound B is given in a consistent manner.

Many existing methods for batch reinforcement learning with function approximation may be modified to solve the constrained version of Bellman equation (6), by embedding resource optimization in the iterative process of estimation. For example, the invention may use a representative reinforcement learning method known as Q-learning, adapted and extended to include resource optimization in its process. In particular, Equation (5) can be extended to the following equation (13), to incorporate constrained optimization in accordance with the general formulation set forth by the extended Bellman Equation or Equation (6).

$$Q(s_t, a_t) \to Q(s_t, a_t) + \alpha(r_t + \gamma_{t+1}(Opt_{\pi \in \Pi} Q(s_{t+1}, \pi(s_{t+1})) - Q(s_t, a_t))) \quad (13)$$

Referring again to the drawings, FIG. 8 provides a pseudo-code for the constrained reinforcement learning based on batch Q-learning as described above. Here the input training data D is assumed to include (e.g., consist of), or contain enough information to recover, episode data. An episode is a sequence of events, where each event consists of a state, an action, and a reward. Episodes preserve the temporal order in which events are observed. States $s_{i,j}$ are feature vectors that contain numeric and/or categorical data fields. Actions $a_{i,j}$ are assumed to be a vector that usually contain 1 or 0, depending on which one of a finite number of actions is taken. Rewards $r_{i,j}$ are real-valued. The base learning module, Base, takes as input a set of event data and outputs a regression model $Q_k$ that maps state-action pairs (s, a) to their estimated Q-values $Q_k$(s, a). In the procedure shown in the figure, and in all variants considered later herein, $\alpha_k$ can, for example, be set to be $\alpha/k$ for some positive constant $\alpha < 1$.

The constrained reinforcement learning module in the foregoing paragraph is based on a representative reinforcement learning method of batch Q-learning, and could benefit from modifications in a number of ways. In particular, many of the existing reinforcement learning algorithms known in the literature, which address various issues associated with solving an MDP in a real world application, could be extended to yield a concrete procedure of constrained MDP, in a manner analogous to the way the Constrained Q-learning method was obtained given the Q-learning method. Here we describe a particularly effective example of such extensions of existing methods, based on a so-called "Advantage Updating" procedure.

The Advantage Updating procedure was proposed to address two important issues of reinforcement learning, namely that of dealing with variable time intervals between state observations, and that of isolating the effect of the actions on the value function, from that of the states themselves. The former issue is important in applications to debt collection optimization, since the decision making on collection actions is typically done on a daily basis and in an asynchronous fashion. The latter issue is especially pressing when function approximation is used in reinforcement learning, since straightforward application of Q-learning, for example, can result in Q-value estimates that are largely dependent on the state features, and independent of the action features. Such estimate would give rise to identically 0 values for the value matrix V, yielding a trivial optimization problem.

The Advantage Updating procedure is formulated so as to estimate what is known as the "advantage" of an action in a state, written A(s,a), and defined as $$A(s, a) = (1 / \Delta t)(Q(s, a) - \max_{a'} Q(s, a')) \quad (14)$$

where $\Delta t$ denotes the time interval between state s and the next state. The advantage is defined relative to the best action from that state, in effect relativizing the effect of an action to the intrinsic value of the state. Also, note that normalization with division by $\Delta t$ is designed to account for the effect of variable interval length on the estimated value function.

FIG. 9 exhibits a pseudo-code for a batch version of Advantage Updating algorithm, and FIG. 10 shows a pseudo-code for the constrained reinforcement learning method based on the batch Advantage Updating algorithm.

In a preferred embodiment, the calls to the base regression and optimization modules in the above procedure are to perform the regression and optimization processes as described in the foregoing general description. Specifically, the regression process will output a segmented linear regression model that represents A with a number of segments defined as conditions on the state features and optionally action features and, for each segment, an associated linear regression function, thus giving rise to the V matrix. The optimization process can use linear programming techniques to compute an action allocation matrix M, so as to maximize the total expected value as in Equation (8), subject to the resource constraints as specified by the input C matrix and resource bound B as in Equation (9).

Details of Action Allocation Optimization

In another aspect of the present invention, the resource optimization described as part of the constrained reinforcement learning process admits a number of concrete instantiations having tangible benefits, when applied to a real world debt collection optimization problem. For example, it is frequently the case that debt collection is carried out by multiple organizations each having its own resource constraints associated with it. In such cases, the simplified resource optimization process described earlier would need to be enhanced. In particular, the allocations of the actions should be done to the respective organizations. Accordingly, there will be a resource bound associated with each one of the organizations.

Another possible source of complication arises due to possible restrictions on the number of actions that can be taken in a given period of time, specified by legal or business constraints. For example, there may be a bound on the number of warrants that can be issued in a week. These constraints form another type of constraints distinct from the resource bound per organization.

It is also possible that the collection action allocations may need to adhere to various forms of hard constraints, independent of whether or not there are sufficient resources to execute the allocated actions. There may be legal requirements with regard to under what conditions certain enforcement actions may be taken. For example, a warrant may need to be issued prior to the creation of a levy. There may also be requirements that are motivated by various business considerations. For example, for reasons having to do with customer relationship management, the collections agency may not wish to contact a debtor until a certain grace period is passed, after due dates or other similar dates. This type of constraints, which may be referred to as "action constraints", is different in nature from the resource constraints, in that they are hard constraints that are to be always observed.

Taking into the foregoing factors into consideration, a version of the resource optimization problem embedded within the framework of constrained reinforcement learning can be formulated as follows.

First some variables are introduced. Let $i = 1, \ldots, n$ denote the state segment indices, $j = 1, \ldots, m$ denote the action indices, $g = 1, \ldots, k$ denote the organizational group indices, and $v = 2^{[m]}$ denote the valid action functions, specifying the set of valid actions. For example, given j, v(j)=1 if j is a valid action, and 0 if it is an invalid action.

Using these variables, we define the following quantities. We let a(i,j,g,v) denote the action allocation, or the number of actions allocated, to part of the segment indexed by i with which the valid action function v is associated, the action indexed by j, to be performed at the group indexed by g. We let d(i,j,g) denote the cost of performing the action indexed by j to an individual with state in segment indexed by i, at the organization group indexed by g, possibly specified in the man-hour it takes to perform it. We let b(g) denote an upper bound on the amount of resources available at group indexed by g, and let f(j) denote an upper bound on the number of actions indexed by j that are permitted, within the time period, both in the time period under consideration. We let v(i,j) denote the value of action indexed by j for segment indexed by i, as output by the model in the constrained reinforcement learning process, and given as input to the optimization.

Given the above definitions, the objective of the resource optimization problem is to determine the allocations a(i,j,g,v)'s so as to maximize the following objective utility function.

$$\sum_{i,j,g,v} v(i, j) a(i, j, g, v) \tag{1}$$

subject to the following constraints:

(Resource Constraints)

$$(\forall g \in [k]) \sum_{i,j,v} d(i, j, g) a(i, j, g, v) \leq b(g) \tag{2}$$

(Action Number Constraints)

$$(\forall j \in [m]) \sum_{i,g,v} a(i, j, g, v) \leq f(j) \tag{3}$$

(Population Constraints)

$$(\forall i \in [n])(\forall g \in [k])(\forall v \in 2^{[m]}) \sum_{j} a(i, j, g, v) = p(i, g, v) \tag{4}$$

(Action Constraints)

$$(\forall i \in [n])(\forall j \in [m])(\forall g \in [k])(\forall v \in 2^{[m]}) a(i,j,g,v) = 0 \text{ if } v(j) = 0 \tag{5}$$

(Non-Negativity Constraints)

$$(\forall i \in [n])(\forall j \in [m])(\forall g \in [k])(\forall v \in 2^{[m]}) a(i,j,g,v) \geq 0 \tag{6}$$

The optimization as formulated is a linear programming problem and can be solved by existing methods of linear programming. When the resource optimization at hand involves hundreds of segments, tens of actions, tens of organization groups, tens and possibly hundreds of valid action functions, the scale of the optimization, with tens of millions of variables, may very well present challenges in terms of required computational resources. It is therefore desirable to take advantage of the characteristics of the optimization problem to cut down on the required computation. One such possibility that is particularly well-suited in the present formulation is the technique known as Dantzig-Wolfe decomposition, which we describe below, as applied to the optimization problem of interest.

Noticing that the population constraints (4), apart from the resource and action number constraints (2), (3), are separable in i,g, and v, we decompose the original optimization problem into a sequence of master problem and a sequence of a number of small scale sub-problems that can be solved separately for each combination of i,g, and v, and the optimization can be performed by appropriately iterating between them.

Specifically, we substitute the variables a with values that are the convex combinations of solutions to the population constraints, resulting in the following sequence of master problems (MP-k).

(MP-k) Maximize the following objective utility function.

$$\sum_{i,j,g,v} v(i, j) \sum_{k \in K} a^k(i, j, g, v) \lambda^k \tag{7}$$

subject to the following constraints:

(Resource Constraints)

$$(\forall g \in [k]) \sum_{i,j,v} d(i, j, g) \sum_{k \in K} (a^k(i, j, g, v) \lambda^k) \leq b(g) \tag{8}$$

(Action Number Constraints)

$$(\forall j \in [m]) \sum_{i,g,v} (a^k(i, j, g, v) \lambda^k) \leq f(j) \tag{9}$$

(Convexity Constraints)

$$\sum_{k \in K} \lambda^k = 1 \tag{10}$$

(Non-Negativity Constraints)

$$(\forall k \in K) \lambda^k \geq 0 \tag{11}$$

where $\{\alpha^k\}$ are elements of A, the set of feasible solutions to the following sub-problems, denoted (SP-k).

(SP-k) Maximize the following objective utility function.

$$\sum_{i,j,g,v} (v(i, j) + \pi_g^k d(i, j, g) + \gamma_j^k) a(i, j, g, v) \tag{12}$$

where $\pi^k$ are the dual variables for the constraints (8), $\gamma_k$ for the constraints (9), and $\delta^k$ for the convexity constraint for an optimal solution of (MP-k), subject to the following constraints:

(Population Constraints)

$$(\forall i \in [n])(\forall g \in [k])(\forall v \in 2^{[m]}) \sum_{j} a(i, j, g, v) = p(i, g, v) \tag{13}$$

(Action Constraints)

$$(\forall i \in [n])(\forall j \in [m])(\forall g \in [k])(\forall v \in 2^{[m]}) a(i,j,g,v) = 0 \text{ if } v(j)=0 \quad (14)$$

(Non-Negativity Constraints)

$$(\forall i \in [n])(\forall j \in [m])(\forall g \in [k])(\forall v \in 2^{[m]}) a(i,j,g,v) \geq 0 \quad (15)$$

For simplicity, we assume that the problem (SP-k) is both feasible and bounded and thus has an optimal solution for any values of $\pi^k$ and $\gamma_k$. Dantzig-Wolfe decomposition method, as applied in this context, is the procedure that iterates between the two problems defined above, as shown in FIG. 11.

Incorporation of Legal and Business Constraints

In another aspect of the present invention, the collection action allocation within the constrained reinforcement learning process may need to adhere to various forms of hard constraints, independent of whether or not there are sufficient resources to execute the allocated actions. As mentioned in the previous section, there may be legal and business requirements with regard to under what conditions certain enforcement actions may be taken. This type of constraints, which may be referred to as "action constraints", is often specified manually by the users of the optimization system. They are typically subject to frequent changes, and it is therefore imperative that the optimization system be equipped with a mechanism for specifying such changes. In another aspect of the present information, the constrained reinforcement learning module can be designed so as to take the updated action constraint definitions as input in a human readable syntax, without having to modifying any other parts of the system.

More specifically, the inventive method achieves this by taking as input the valid action function, denoted v, as described in the previous section, specifying the set of valid actions for a given state, and using it as part of the constraints in the constrained optimization module. The inventive method may use as a representation of the valid action function, a set of rules each of which consists of a conjunction of conditions on the state features of the debtor in question, and the set of collection actions that are prohibited for the segment of debtors, or their states, satisfying the said conditions. It will be understood to those skilled in the art that rules of this form may be conveniently specified and maintained in commercially available business rules engines or rules management tools.

Feature Specification and Feature Mapping

In another aspect of the present invention, the various inputs and aspects of the optimization process, particularly legal and business constraints and state features, may need to be modified reflecting changes in the business conditions, environment or policies, and it may be desired that the user be able to make such changes by modifying isolated input data, without having to change the system of debt collection optimization.

As described in the section on "System Architecture and Control Flow", the data preparation step (Step 2 in the flow chart shown in FIG. 2) accesses event data, consisting of all incoming and outgoing events concerning each debtor, and possibly static data, such as demographic information of the debtor, in generating the training data as well as scoring data passed onto subsequent steps. Static data, if they exist, could be joined with event data in a number of possible ways, including, for example, by treating them as "event data" of the form "a given piece of static information is found or updated on a given debtor at a given point in time". Thus, without loss of generality, we may assume that the input data are all event data, that is, a time stamped sequence of events pertaining to the debtor in question.

Given the event data, they are to be converted into training data as well as scoring data. It is useful to notice that the conversion process for scoring data is implied, once that for the training data is specified, since the training data are sequences of state features for multiple time steps in the past, whereas the scoring data consist of the current, updated state features for each debtor. Thus, below, we describe the portion of the data preparation procedure for generating the training data.

There are two categories of features to be generated by the data preparation module, the "modeling features" that are the primary state features for use in the MDP portion of the constrained-MDP formulation, and the "action constraint" features, that are used for the optimization problem within the constrained MDP formulation. In general, however, it is possible that the two categories overlap, for example an action constraint feature may be used as a modeling feature.

Action constraint features are 0,1-valued binary features that correspond to the "valid action functions" v, as described in the section on "Details of Action Allocation Optimization", mapping actions to 0 or 1, depending on whether the given action is permitted for the associated debtor.

Both modeling features and action constraint features can be defined, using a certain feature specification language, in terms of the time stamped event data. Existing general description languages could in principle be used to describe these features, if computational efficiency was of no concern. For example, the full first order logic would certainly be expressive enough. Given the need to process a large quantity of event data in the data preparation module, however, it is imperative that specifics of the feature mapping task at hand be leveraged to make a more efficient procedure possible. Specifically, the type of features required for effective constrained reinforcement learning in the context of the present invention is characterized by the way it typically involves aggregations of a certain event attribute over a period of time, subject possibly to a logical condition in terms of attributes possibly including the summand attribute and in general containing one or more of the other attributes.

Referring back to the drawings, FIG. 11 shows the specification of a feature description language, according to a preferred embodiment of the invention, which takes advantage of the feature characteristics specific to the present context in confining its syntax and the corresponding semantics to a manageably small subset of the general first order logic language. FIG. 12 shows some concrete examples of feature definitions specified using this language, given as input to the data preparation module according to a preferred embodiment of the invention.

Referring back again to the drawings, FIG. 13 shows a flow chart for a data preparation module, which is designed to perform feature computation task for arbitrary features defined using the feature description language described above. Herein is described the portion of the data preparation module for generating the training data, which accesses the feature definitions specified in the said feature description language and input event data, and generates as output training data, according to a preferred embodiment of the invention.

In Step 1 of the flow chart shown in FIG. 13, the module receives as input a list of feature definitions $\{FD_j: j=1, \ldots, m\}$, specified using a feature description language of the type described above, and a list or a set of events $E = \{<e_{i,t}>: i \in I;$ t∈R}, where each $<e_{it}>$ is an n-dimensional vector over some domain, representing the attributes for an event taking place at time t for debtor's episode index i. Here, a debtor's episode may correspond to the entire history of a debtor, or possibly a sub-segment of the entire history, which may, for example, be any period during which consecutive events or actions occur for that debtor. The exact nature of the definition of what constitutes an episode will depend on the exact application, but the partitioning of the entire history of events per debtor into possibly multiple episodes can be done efficiently.

In Step 2, for the entire list of expanded feature set F, that is, the set of all features defined in the input as well as all the sub-expressions included in any of the input feature descriptions, $\{FD_j: j=1, \ldots, m\}$, the dependency structure between them is determined, and an ordering R between the expanded feature set F such that whenever, $R(x)<R(y)$, the value of y is not needed to compute the value of x. If there is a cycle in the dependency structure and no such ordering exists, then that determination should be given as a warning to the user, urging them to revise the feature descriptions.

In Step 3, determination is made, for each debtor or episode index, i∈I, which subset of the associated events correspond to actions, subject to optimized allocation. This can be usually done by simply scanning through all the events to check to see if they belong to a prescribed list of actions. This determination is used to determine the sampling points, that is, the time steps at which to compute the state, action and reward values for the debtor or episode index, since it is desirable, for the purpose of training constrained reinforcement methods, to sample whenever actions take place. It may also be desired that some sampling be done at time steps when "no action" is taken. It is possible to do so in a number of ways, for example, by inserting among the input events, events corresponding to "no actions" whenever no action is taken onto a given debtor over some prescribed period of time. Those skilled in the art will thus recognize that the set of time steps to be computed in Step 3, $T=\{t_1: l=1, \ldots, na(i)\}$, where na(i) denotes the number of actions for debtor or episode index i, can be generalized as the set of sampling points for the same index.

In Step 4, the feature values are actually computed. Here, it is important to recognize that the action features as well as the reward value are no different from the expanded feature, and are to be included in the expanded feature set. More specifically, Step 4 proceeds as follows. For each of the debtor or episode indices i, and for each feature in the expanded feature set j, for each sampling time step t for that index i, it computes the value of the feature description $FD_j$ according to a case statement depending on its expression. For example, if the expression equals $FD_j=tsum(a(F), \Delta t)$, where a(F) denotes an arithmetic or logical expression involving expressions from the expanded feature set F, and $\Delta t$ denotes the time period up to the time step in question over which the summation is to be done, the computation is done by summing over the value of the expression a(F) evaluated on the events with time stamp between time step t and t+$\Delta t$. It is important to note that the values a(F) should have been computed in an earlier iteration for j of Step 4 by virtue of the fact that the computation of $FD_j$ depends on that of a(F) and the way the re-ordering R has been determined in Step 2. Similarly, if the expression equals $FD_j=telapsed(c(F))$ then, the time elapsed since the last time the condition specified by the conditional expression c(F) over F was satisfied prior to the reference time step t. Again, the values c(F) should have been computed in an earlier iteration for j for the reason described above. Finally, the determination is made which ones of the computed features correspond to the state, action, or reward, and the computed values are formatted appropriately as $d_{itj}=(s_{itj}, a_{itj}, r_{itj})$.

Finally, Step 5 outputs the computed data as $D=\{d_{itj}\}$ output training data.

The invention claimed is:

1. A computerized method for optimizing debt collection using predictive data modeling in order to determine an optimal sequence of collection actions against a plurality of debtors to maximize a total return throughout a course of collection cases in the presence of constraints on available resources for executing collection actions, comprising the steps of:

accessing event data from a storage module which contain historical dated records of events including collection actions taken against each debtor and transactions from each debtor including payment;

estimating using a computer a value function specifying an expected value of each of one or more collection actions for each of one or more states of a debtor, said step of estimating using a constrained reinforcement learning process to approximately estimate said value function with respect to a constrained Markov Decision Process formulation, to maximize long term expected return throughout the course of a collection process, and to optimize collection resources within one or more organizations for maximum expected return subject to one or more given resource constraints for said organizations;

wherein said constrained reinforcement learning process uses a segmented linear regression method to approximately estimate said value function and allows resource optimization within a constrained reinforcement learning module to be performed with respect to one or more segments output by said segmented linear regression method, wherein an objective function is approximated using one or more regression coefficients on one or more segment action pairs and one or more estimated sizes of said segmented action pairs; and wherein one or more existing business or legal rules, expressed as action constraints, are provided as input and used as additional constraints in a resource, optimization process within said constrained reinforcement learning process; and using a computer to provide an optimized debt collection policy as output in a machine readable formal wherein said optimized debt collection policy is expressed as one or more rules consisting of one or more segments and corresponding action allocations; and providing output on a peripheral device based on said optimized debt collection policy in a human-readable format.

2. The computerized method of claim 1, in which a resource optimization module achieves scalable optimization by formulating an optimization problem using a Dantzig Wolfe decomposition.

3. The computerized method of claim 1, wherein one or more state features are generated in a data preparation procedure via one or more feature definitions specified using a temporal feature description language defined over time series even data.

4. The computerized method of claim 1, wherein one or more action constraint features are generated in a data preparation procedure via one or more feature definitions specified using a temporal feature description language defined over time series event data.

5. A computerized debt collection optimization system which uses predictive data modeling in order to determine an optimal sequence of collection actions against a plurality of debtors to maximize a total return through a course of collection cases in the presence of constraints on available resources for executing collection actions, comprising:

a storage medium storing event data contain historical dated records of events including collection actions taken against each debtor and transactions from each debtor including payment;

one or more computers estimating a value function specifying an expected value of each of one or more collection actions for each of one or more states of a debtor, said one or more computers accessing said event data from said storage medium and using a constrained reinforcement learning process to approximately estimate said value function with respect to a constrained Markov Decision Process formulations, to maximize long term expected return throughout the course of a collection process, and to optimize a collection resource within an organization within a collection agency for maximum expected return subject to one or more given resource constraints for said organization;

wherein said constrained reinforcement learning process uses a segmented linear regression method to approximately estimate said value function and allows resource optimization within a constrained reinforcement learning module to be performed with respect to one or more segments output by said segmented linear regression method. wherein an objective function is approximated using one or more regression coefficients on one or more segment action pairs and one or more estimated sizes of said segmented action pairs; and wherein one or more existing business or legal rules, expressed as action constraints, are provided as input and used as additional constraints in a resource optimization process within said constrained reinforcement learning process, and;

said one or more computers providing an optimized debt collection policy as output in a machine readable format, wherein said optimized debt collection policy is expressed as one or more rules consisting of one or more segments and corresponding action allocations; and a peripheral device providing output based on said optimized debt collection policy in a human-readable format.

6. The system of claim 5, in which a resource optimization module achieves scalable optimization by formulating an optimization problem using a Dantzig Wolfe decomposition.

7. The system of claim 5, wherein a state feature is generated in a data preparation procedure via one or more feature definitions specified by said one or more computers using a temporal feature description language defined over time series event data.

8. The system of claim 5, wherein an action constraint feature is generated in a data preparation procedure via one or more feature definitions specified using a temporal feature description language defined over time series event data.

9. A machine readable medium containing instructions for optimizing debt collection which uses predictive data modeling in order to determine an optimal sequence of collection actions against a plurality of debtors to maximize a total return through a course of collection cases in the presence of constraints on available resources for executing collection actions, on which is provided:

machine-readable instructions for accessing event data from a storage module which contain historical dated records of events including collection actions taken against each debtor and transactions from each debtor including payment;

machine-readable instructions for using a computer to estimate a value function specifying an expected value of each of one or more collection actions for each of one or more states of a debtor, said machine-readable instructions coding for using a constrained reinforcement learning process to approximately estimate said value function with respect to a constrained Markov Decision Process formulation, to maximize long term expected return throughout the course of a collection process and, to optimize a collection resource within an organization within a collection agency for maximum expected return subject to one or more given resource constraints for said organization;

wherein said constrained reinforcement learning process uses a segmented linear regression method to approximately estimate said value function and allows resource: optimization within a constrained reinforcement learning module to be performed with respect to one or more segments output by said segmented linear regression method, wherein an objective function is approximated using one or more regression coefficient on one or more segment action pairs and one or more estimated sizes of said segmented action pairs, and wherein one or more existing business or legal rules, expressed as action constraints, are provided as input and used as additional constraints in a resource optimization process within said constrained reinforcement learning process;

machine-readable instructions for using a computer to provide an optimized debt collection policy as output in a machine readable format, wherein said optimized debt collection policy is expressed as one or more rules consisting of one or more segments and corresponding action allocations; and machine-readable instructions for providing output on a peripheral device based on said optimized debt collection policy in a human-readable format.

* * * * *